Nov. 30, 1965  J. D. BALL ETAL  3,221,254
REMOTE LINE-VOLTAGE MONITOR USING THE CHARGE ON A CAPACITOR
TO INDICATE THE REMOTE VOLTAGE
Filed Nov. 3, 1961

INVENTORS.
JOHN D. BALL,
CHARLES J. CHARSKE,
BY Frank S. Troidl
ATTORNEY.

United States Patent Office 3,221,254
Patented Nov. 30, 1965

3,221,254
REMOTE LINE-VOLTAGE MONITOR USING THE CHARGE ON A CAPACITOR TO INDICATE THE REMOTE VOLTAGE
John D. Ball and Charles J. Charske, Houston, Tex., assignors, by mesne assignments, to Esso Production Research Company, Houston, Tex., a corporation of Delaware
Filed Nov. 3, 1961, Ser. No. 150,075
2 Claims. (Cl. 324—111)

This invention relates to well logging operations. More particularly, this invention is an electrical system for indicating variations from a desired voltage across a load enclosed in a well logging tool and regulating the supply to keep the remote voltage across the load constant.

In many well logging applications, A.C. power is supplied to an instrument which is located at the remote end of a long transmission line. The resistance of the line may be unknown and variable. It is usually required that for most efficient operation of the instrument the voltage at its terminals must be held, within fairly close limits, to a specific value.

A voltage regulator may be used at the remote end of the transmission line to compensate for voltage variations which may normally be expected to occur. However, the efficiency of most typical regulators is low; and, furthermore, they may not be expected to always compensate for extreme voltage variations.

This invention is an electrical system which indicates variations from the desired voltage across a load enclosed in a well logging tool and includes a means for compensating for any undesirable changes. This system has many advantages among which are the following:

(1) A minimum of additional conductors is required.
(2) The transmission line is not exposed to unnecessarily high voltages.
(3) A D.C. error signal is derived which can be readily adapted to an audible or visual alarm, or can be used to control a servo-mechansim for automatic compensation.

Figure 1:
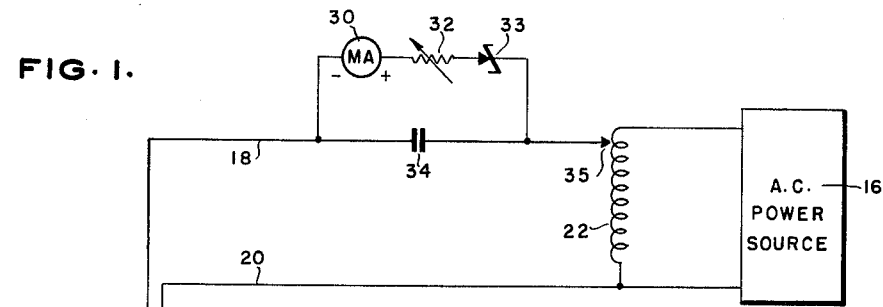
Figure 2:
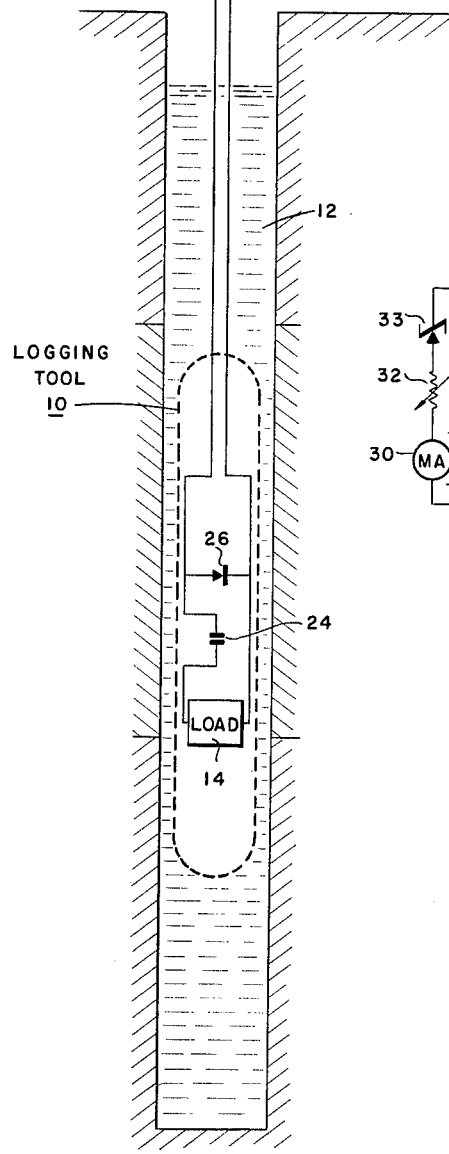
Figure 2:
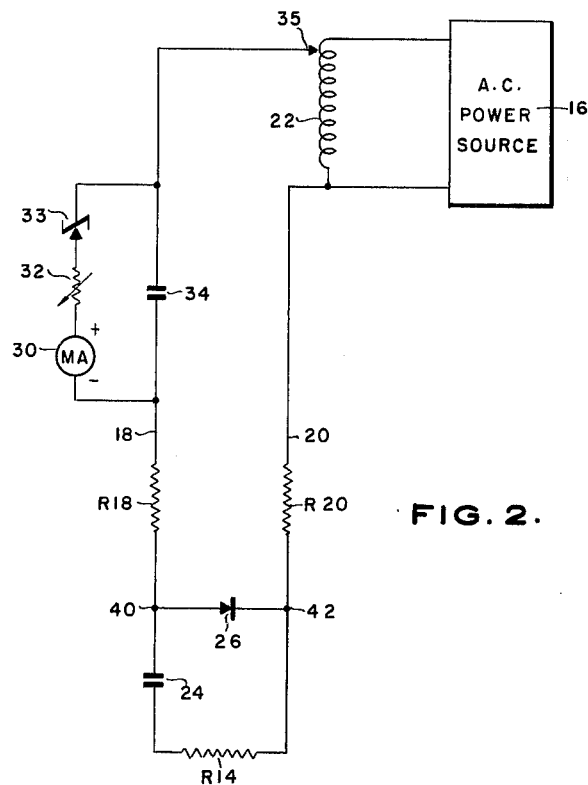

The invention, as well as its many advantages, may be understood by reference to the following detailed description and drawings in which:

FIG. 1 is a schematic view showing the general arrangement of the new electrical system; and FIG. 2 is an electrical circuit diagram of the system.

Referring to FIG. 1, a logging tool 10 is shown in its lowered position within a well bore 12. An electrical load indicated by the numeral 14 is included within the tool 10. The load 14 represents the electrical components of the logging tool. The load may be resistive and/or reactive in nature.

An A.C. power source 16 feeds electrical current to the load 14 by means of the transmission lines 18 and 20. The amount of voltage fed across transmission lines 18 and 20 may be controlled by a transformer, such as autotransformer 22, connected to the A.C. power source 16.

A capacitor 24 is included in the logging tool in series with the load 14. A diode 26 is also mounted within the logging tool in parallel with the capacitor 24 and the load 14. Diode 26 conducts when the cathode is negative in potential with respect to the anode.

A direct current indicating means, such as the direct current milliammeter 30, a resistor 32 and a zener diode 33 are included in the transmission line 18. A capacitor 34 is connected across the milliammeter 30, resistor 32 and zener diode 33. The voltage across the load 14 can be varied or adjusted by means of the voltage tap 35 in contact with the coil 22 of the autotransformer.

FIG. 2 is an electrical schematic diagram useful in explaining the operation and advantages of this new electrical system. Like parts in FIG. 2 to like parts in FIG. 1 are indicated by the same numerals. However, FIG. 2 is different from FIG. 1, among other things, in that a resistor $R_{18}$, a resistor $R_{20}$ and a resistor $R_{14}$ are shown to represent the resistances of the line 18, line 20 and load 14, respectively, of FIG. 1.

In the circuit shown in FIG. 2, it is desired that the voltage across the load, $R_{14}$, be held constant. The resistance of resistor 32 is large. The reactances of capacitors 24 and 34 are small compared to the load 14. When power is first applied, diode 26 conducts a current limited only to the magnitude of the peak voltage between terminals 40 and 42. After only a few cycles, the capacitors 24 and 34 are charged to a voltage proportional to the peak voltage appearing between terminals 40 and 42. The manner in which this comes about is as follows. Assume that the A.C. power source is energized to a desired voltage. On the first half of the first half cycle of the output voltage of power source 16 over which voltage tap 35 is positive with respect to the terminal of autotransformer 22 that is connected to line 20, diode 26 will conduct. Capacitor 34 will charge to a potential somewhat less than the peak voltage at voltage tap 35 because of the current-limiting effect of resistors R18 and R20. During the remainder of the first half cycle and during a portion of the next half cycle, diode 26 will not conduct, and capacitor 24 will charge and capacitor 34 will partially discharge. This process will repeat on successive half cycles until both of the capacitors 34 and 24 are charged to a voltage about equal to the peak voltage across load R14. The voltage across capacitor 24 will not appreciably exceed the peak A.C. voltage across load R14 because this places terminal 40 at a positive potential with respect to terminal 42 so that rectifier 26 conducts to discharge capacitor 24 to equalize the voltage across capacitor 24 with the peak voltage across load R14. Also, capacitor 34 will remain at substantially the voltage across capacitor 24 because capacitor 34 will discharge into capacitor 24 after half cycles on which it rises above the voltage across capacitor 24. The A.C. voltage appearing across load R14 will be equal to the output voltage of autotransformer 22 less the A.C. voltage drop across resistors R18 and R20. The voltage across capacitor 34 is measured by the circuit including milliammeter 30, resistor 32, and Zener diode 33. No current will flow through the milliammeter until the Zener voltage of diode 33 is reached, at which time the current indicated by milliammeter 30 will be indicative of the extent to which the voltage across capacitor 34 exceeds the Zener voltage of diode 33. Should the load current rise to increase the voltage drop across resistors R18 and R20, the voltage across capacitor 24 will decrease to the peak voltage across the load. The D.C. voltage across capacitor 34 will decrease because of the tendency of the capacitors to equalize, as described above, and also because of the slight drain on capacitor 34 imposed by the voltage measuring circuit until the voltage across capacitor 34 is again about equal to the voltage across capacitor 24. Thus, the voltage across capacitor 34 is indicative of the voltage appearing across load R14. The resistor 32 and/or zener diode 33 are chosen so that a small amount of direct current flows through milliammeter 30 at any desired voltage on capacitor 34, say slightly below the voltage on capacitor 34 when the required voltage is applied across the load $R_{14}$.

The resistor 32 may be adjusted to provide mid-scale reading when the desired voltage at the load is obtained. Variations in the load, $R_{14}$, in the conducting line resistances $R_{18}$ and $R_{20}$ or in the generator 16 at the surface of the earth will be reflected by the D.C. milliammeter 30. These variations can be compensated for by adjusting the tap 35 of the autotransformer 22.

We claim:
1. An electrical system for indicating variations from a desired voltage across a load enclosed in a well logging tool at a remote location comprising:
   an alternating current power source including means for varying the output voltage thereof;
   an elongated logging cable having two electrical conductors connected to the source for feeding current to said load;
   a first capacitor in one of the conductors;
   a second capacitor in the logging tool electrically connecting said logging cable conductors in series with the load;
   a half-wave rectifier in said logging tool in parallel with the series-connected capacitor and load to conduct unidirectional current; and
   direct current indicating means connected across said first copacitor for measuring the voltage thereacross.
2. The electrical system of claim 1 wherein a series-connected Zener diode and a resistor are connected in series with the direct current indicating means across said first capacitor such that current will flow through the current indicating means when the voltage on said first capacitor is above a predetermined voltage, which predetermined voltage is below the voltage on said capacitor when the voltage across said load is the desired voltage.

References Cited by the Examiner
UNITED STATES PATENTS 2,305,952   12/1942   Cravath _____ 324—119
3,064,143   11/1962   Sanderson _____ 307—88.5

WALTER L. CARLSON, *Primary Examiner*.

FREDERICK M. STRADER, *Examiner*.